United States Patent
Mezer et al.

(10) Patent No.: US 7,693,240 B2
(45) Date of Patent: Apr. 6, 2010

(54) TECHNIQUES TO CONVERGE AND ADAPT A COMMUNICATION SYSTEM RECEIVER

(75) Inventors: Amir Mezer, Haifa (IL); Alex Sokolovsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 704 days.

(21) Appl. No.: 11/394,925

(22) Filed: Mar. 31, 2006

(65) Prior Publication Data
US 2007/0237270 A1    Oct. 11, 2007

(51) Int. Cl.
H03D 1/04       (2006.01)
H03H 7/30       (2006.01)
H03K 9/00       (2006.01)

(52) U.S. Cl. .................. 375/346; 375/229; 375/316
(58) Field of Classification Search .............. 375/346, 375/229, 316
See application file for complete search history.

(56) References Cited

U.S. PATENT DOCUMENTS

| | | | | |
|---|---|---|---|---|
| 4,466,132 A | * | 8/1984 | Namiki | 455/295 |
| 5,311,558 A | * | 5/1994 | Bergmans | 375/346 |
| 5,887,032 A | * | 3/1999 | Cioffi | 375/257 |
| 5,995,565 A | | 11/1999 | Tong et al. | 375/346 |
| 6,014,412 A | * | 1/2000 | Wiese et al. | 375/346 |
| 6,965,657 B1 | * | 11/2005 | Rezvani et al. | 375/346 |
| 2003/0016770 A1 | * | 1/2003 | Trans et al. | 375/346 |
| 2003/0223489 A1 | * | 12/2003 | Smee et al. | 375/233 |
| 2004/0136453 A1 | * | 7/2004 | Lin et al. | 375/232 |

* cited by examiner

Primary Examiner—Mohammad H Ghayour
Assistant Examiner—Sarah Hassan
(74) Attorney, Agent, or Firm—Kacvinsky LLC (57) ABSTRACT

A system, apparatus, method and article to converge a communications system receiver are described. The apparatus may include an interference canceller to receive an interference signal and to produce an adaptive signal. The interference canceller is adapted by a first adaptation module. An equalizer is coupled to the interference canceller. The interference canceller is located before the equalizer. The equalizer receives an input signal formed of a sum of a received input signal and the adaptive signal. A slicer is coupled to the equalizer and to the interference canceller. The slicer receives an equalized version of equalizer coefficients and produces a slicer error. The first adaptation module adapts the interference canceller utilizing a convolution of the interference signal with the equalizer coefficients, and multiplying the results by the slicer error. Other embodiments are described and claimed.

14 Claims, 8 Drawing Sheets

TECHNIQUES TO CONVERGE AND ADAPT A COMMUNICATION SYSTEM RECEIVER

BACKGROUND

High speed communication systems capable of higher throughput data rates are emerging. Gigabit Ethernet networks may communicate information at 1 gigabits-per-second (Gbps) or higher over high speed channels. These high speed channels, however, typically realize a corresponding increase in error rates. Techniques such as forward error correction may be used to decrease the error rates. Such techniques, however, may require a communication system to communicate additional overhead in the form of error correcting information. The additional overhead may decrease the effective throughput for a communication system.

A typical physical communication channel, such as an Ethernet cable, for example, introduces inter-symbol interference (ISI) in a received data signal. To minimize the adverse effects of ISI and to improve signal-to-noise ratio (SNR), it is customary to include a filter in the receiver known as an "equalizer." In some receivers, the entire equalizer may be adaptive. In such cases, however, convergence of the equalizer may be rather slow. In other receivers a fixed equalizer may be used in combination with an adaptive equalizer to provide improved convergence. Even with use of a combination of fixed and adaptive equalizers, however, convergence of the adaptive equalizer may be slower than desirable.

A communications system that includes passing a signal through a channel which introduces ISI and at least one additional interference signal (e.g., an echo signal, transmitted by near-end transmitter device, which has passed through an echo channel) in addition to jitter of the sampling clock at the analog-to-digital (A/D) converter in the receiver, results in a time-variant interference channel. This time-variant interference channel requires the adaptation of an interference canceller. An adaptive interference canceller adaptively filters a noise reference input to maximally match and subtract out noise or interference from a primary input signal (e.g., desired signal plus noise). In order to meet communications system performance requirements, it may be necessary to perform equalization and adaptation in order to reduce the ISI in the system. In addition, it may be necessary to include an interference canceller (e.g., an echo canceller) to cancel the interference described above. The interference canceller may be adapted using one of multiple adaptation processes and/or algorithms. For example, adaptation may be implemented using any of the well-known methods (e.g., least-mean-squares or LMS, recursive least squares or RLS, or Fast RLS).

These methods are well known adaptation algorithm. Briefly, an LMS adaptation algorithm, for example, uses an instantaneous estimate of a gradient vector of a cost function to generate an approximation of the steepest descent algorithm. The instantaneous estimate of the gradient is based on sampled values of a tap-input vector and an error signal. The algorithm iterates over each coefficient in the filter and moves it in the direction of the approximated gradient. The LMS algorithm requires a reference signal that represents the desired filter output. The difference between the reference signal and the actual output of the transversal filter is known as the error signal. An adaptation process employing the LMS algorithm determines a set of filter coefficients that minimize the expected value of a quadratic error signal, i.e., to achieve the least mean squared error (thus the name). As the LMS, RLS, and fast RLS are well known, no further details of these adaptation techniques are necessary for an understanding of the embodiments and examples described and illustrated herein.

DETAILED DESCRIPTION

Various embodiments may be generally directed to techniques to converge a communications receiver. In one embodiment, for example, an apparatus may include an interference canceller to receive an interference signal and to produce an adaptive signal. The interference canceller is adapted by a first adaptation module. An equalizer is coupled to the interference canceller. The interference canceller is located before the equalizer. The equalizer receives an input signal formed of a sum of a received input signal and the adaptive signal. A slicer is coupled to the equalizer and to the interference canceller. The slicer receives an equalized version of the equalizer input signal and produces a slicer error. The first adaptation module adapts the interference canceller utilizing a convolution of the interference signal with the equalizer coefficients, and multiplying the result by the slicer error. Other embodiments are described and claimed. In this manner, the receiver can be adapted to converge using multiple adaptation modules, increase receiver and communication system performance, and reduce power consumption. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
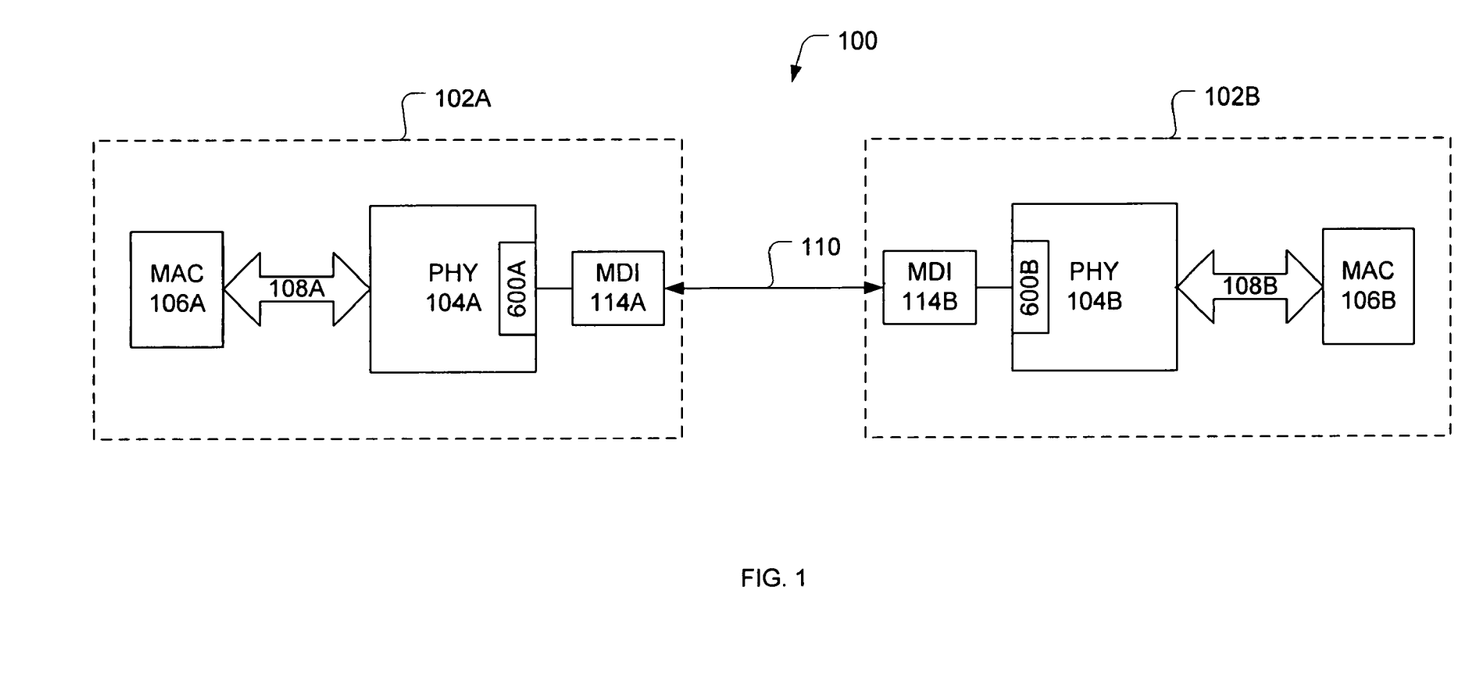
FIG. 1 is a block diagram of a system provided in accordance to various embodiments.

FIG. 1 is a block diagram of a system 100 provided in accordance to various embodiments. System 100 may comprise a first network interface 102A and a second network interface 102B coupled over communication a channel 110 physical medium. Communication channel 110 physical medium may comprise a standard cable (not separately shown) such as a Gigabit Ethernet cable, for example. Network interfaces 102A, B may comprise respective physical (PHY) units 104A, B and respective media access control (MAC) units 106A, B. PHY units 104A, B are coupled to MAC units 106A, B via respective bidirectional links 108A, B. Although not separately indicated in the drawing, network interfaces 102A, B may comprise transceivers, hybrids, digital signal processors, and other components. In one embodiment, PHY units 104A, B may comprise transceivers and hybrids, for example, and MAC units 106A, B may be implemented with a digital signal processor. In one embodiment, PHY units 104A, B may comprise respective receivers 600A, B. Each receiver 600A, B may comprise an adaptive digital interference canceller and an equalizer module, for example. Receivers 600A, B may be configured such that the adaptive interference cancellers may be adapted in accordance with the various embodiments of adaptation techniques or processes described herein. For, example in one embodiment, adaptive interference canceller adaptively filters a noise reference input to maximally match and subtract out noise or interference from a primary input signal. In various embodiments, network interfaces 102A, B may be part of a computer system and may be coupled to a general purpose processor to which other components such as volatile and non-volatile memory devices, mass storage, and input/output devices may be coupled.

Network interfaces 102A, B may allow devices coupled thereto to communicate information over a network. In various embodiments, network interfaces 102A, B may represent any network interface suitable for use with a number of different Ethernet techniques as defined by the Institute of Electrical and Electronics Engineers (IEEE) 802.3 series of standards. For example, network interfaces 102A, B may comprise a structure arranged to operate in accordance with the IEEE 802.3-2005 standard. The IEEE 802.3-2005 standard defines 1000 megabits per second (Mbps) operations (1000BASE-T) using four pair twisted copper Category 5 wire, 10 Gbps operations using fiber cable, and 10 Gbps operations (10GBASE-CX4) using copper twinaxial cable (collectively referred to herein as "Gigabit Ethernet"). More particularly, network interfaces 102A, B may have a structure arranged to operate in accordance with the IEEE Standard 802.3-2005 titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications, Amendment: Ethernet Operation over Electrical Backplanes," Draft Amendment P802.3ap/Draft 2.1, 2005 ("Backplane Ethernet Specification"). Network interface 102A, B, however, is not necessarily limited to the techniques defined by these standards, and network interfaces 102A, B may use other techniques and standards as desired for a given implementation. The embodiments are not limited in this context.

Still more particularly, network interfaces 102A, B may have a structure arranged to operate in accordance with the IEEE Proposed Standard 802.3an titled "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications: Amendment: Physical Layer and Management Parameters for 10 Gb/s Type 10GBASE-T," Draft Amendment P802.3an/Draft 3.1, 2005 ("10GBASE-T Specification"). Network interface 102A, B, however, is not necessarily limited to the techniques defined by these standards, and network interfaces 102A, B may use other techniques and standards as desired for a given implementation. The embodiments are not limited in this context.

As shown in FIG. 1, network interfaces 102A, B may include respective MAC units 106A, B and PHY units 104A, B. In various embodiments, MAC units 106A, B and/or PHY units 104A, B may be arranged to operate in accordance with one of the Ethernet architectures as previously described, such as the IEEE 802.3-2005 series of standards including the 10GBASE-T and/or Backplane Ethernet Specification. Although FIG. 1 illustrates system 100 with a limited number of elements, it may be appreciated that system 100 may include more or less elements in different topologies and still fall within the scope of the embodiments. The embodiments are not limited in this context.

In one embodiment, for example, MAC units 106A, B and/or PHY units 104A, B may be arranged to operate in accordance with the 10GBASE-T and/or the Backplane Ethernet Specification, for example. Backplane Ethernet combines the IEEE 802.3 MAC and MAC Control sublayers with a family of Physical Layers defined to support operation over a modular chassis backplane. Backplane Ethernet supports the IEEE 802.3 MAC operating at 1000 Mbps and/or 10 Gbps. For 1000 Mbps operation, the family of 1000BASE-X PHY signaling systems is extended to include 10000BASE-KX. For 10 Gbps operation, two PHY signaling systems are defined. For operation over four logical lanes, the 10GBASE-X family is extended to include 10GBASE-KX4. For serial operation, the 10GBASE-R family is extended to include 10GBASE-KR (e.g., using various serializer/deserializer or "SERDES" techniques). Backplane Ethernet also specifies an Auto-Negotiation function to enable two devices that share a backplane link segment to automatically select the best mode of operation common to both devices.

It will be appreciated by those skilled in the art that 10GBASE-T is a standard proposed by the IEEE 802 committee to provide 10 Gigabit/second connections over conventional unshielded twisted pair cables. The committee currently working on the standard is IEEE 802.3an, a subgroup of IEEE 802.3. To run multi-gigabit data rates on four-pair copper cabling, however, it may be necessary to employ sophisticated digital signal processing techniques to eliminate the effects of near-end and far-end cross-talk between pairs of cable and to remove the effects of near-end and far-end signal reflections, otherwise known as echoes. Elimination of noise that is external to the cable, such as electromagnetic interference from outside sources or adjacent cables, is difficult. Cable-to-cable noise, or alien cross-talk, for example, prevents wiring from reliably operating under worst-case 330-foot conditions. Accordingly, to support a suitable cabling system for 10GBASE-T, a new PHY, which interfaces with existing 10G MAC and Gigabit Media Independent Interface (GMII) in the IEEE model, is proposed. The PHY contains the functions to transmit, receive, and manage encoded signals that are recovered from cabling systems. The PHY may be based, for example, on pulse amplitude modulation (PAM) encoding to encode information as a stream of pulses with discrete amplitudes. This is the same modulation technique currently used in 100Base-T and 1000Base-T, but the symbol rates and digital signal processing techniques are enhanced.

With reference to the seven-layer Open System Interconnect ("OSI") Reference Model developed by the International Standards Organization ("ISO"), MAC units 106A, B implement MAC layer operations. The MAC layer is a sublayer of the data link layer. The data link layer is primarily concerned with transforming a raw transmission facility into a communication line free of undetected transmission errors for use by the network layer. The data link layer accomplishes this task by breaking input data into data frames, transmitting the data frames sequentially, and processing acknowledgement frames. The MAC sublayer provides additional functionality concerned with controlling access to broadcast networks (e.g., Ethernet). In the case of Ethernet architecture, for example, the MAC sublayer may implement a CSMA/CD protocol.

In various embodiments, MAC units 106A, B are coupled to respective PHY units 104A, B via respective bi-directional links 108A, B to provide data paths between MAC units 106A, B and respective PHY units 104A, B. Bi-directional links 108A, B are often referred to as a Media Independent Interface ("MII"), an xMII in the case of implementations of 100 Mbps or higher, X attachment unit interface ("XAUI") in the case of 10 Gbps implementations, or X fiber interface ("XFI") in the case of dual path 10 Gbps implementations. In one embodiment, for example, bi-directional links 108A, B may comprise a 10 Gbps MII (XGMII) when MAC units 106A, B and/or PHY units 104A, B are implemented for serial operations in accordance with 10GBASE-KR as defined by the Backplane Ethernet Specification. Bi-directional links 108A, B may use a 4-octet wide data path, for example, when implemented as an XGMII bi-directional link. In one embodiment, for example, bi-directional links 108A, B may comprise a XAUI link where the XGMII from MAC units 106A, B is extended through a XGXS sublayer (e.g., XGMII extender sublayer) which provides XGMII on both sides with XAUI used therebetween to extend it. The embodiments are not limited in this context.

In various embodiments, PHY units 104A, B implement physical layer operations. The physical layer is primarily concerned with transmitting raw bits over physical medium, e.g., communication channel 110 physical medium, which may be some form of network. PHY units 104A, B are coupled to communication channel 110 physical medium via respective media dependent interfaces (MDI) units 114A, B, for example. Communication channel 110 physical medium may include various physical communications media, such as an optical fiber, a twisted pair conductor, or the like. In one embodiment, for example, communication channel 110 physical medium is a four pair twisted conductor, such as copper, conforming to a Category 5, 6, 7 or the like cable. In the four pair twisted conductor embodiment, PHY units 104A, B converts digital data received from respective MAC units 106A, B (e.g., 1000BASE-X or 10GBASE-X) into analog symbols (e.g., 1000BASE-T or 10GBASE-T) for transmission over communication channel 110 physical medium. For example, PHY units 104A, B may encode the digital data using Manchester encoding or the like. Communication channel 110 physical medium may operate at any number of bandwidths, including 100 Mbps, 1 Gbps, 10 Gbps, and so forth. PHY units 104A, B may be connected or coupled to communication channel 110 physical medium using any connectors suitable for a given type of communications media, such as an electrical connector, optical connector, and so forth. In one embodiment, for example, PHY units 104A, B may be connected or coupled to communication channel 110 physical medium to support operation over differential, controlled impedance traces on a printed circuit board with two or more connectors and total length up to at least 1 m in accordance with the Backplane Ethernet Specification. The embodiments are not limited in this context.

In various embodiments, PHY units 104A, B may further implement operations for various sublayers of the physical layer, including a physical coding sublayer ("PCS"), a physical medium attachment ("PMA") sublayer, and a physical medium dependent ("PMD") sublayer. In one embodiment, for example, PHY units 104A, B may implement FEC operations for the various sublayers, such as used between the PMA sublayer and PCS sublayer, for example. First and second network interface units 102A, B and corresponding components and channel impairments may be described in more detail with reference to FIG. 2.

Figure 2:
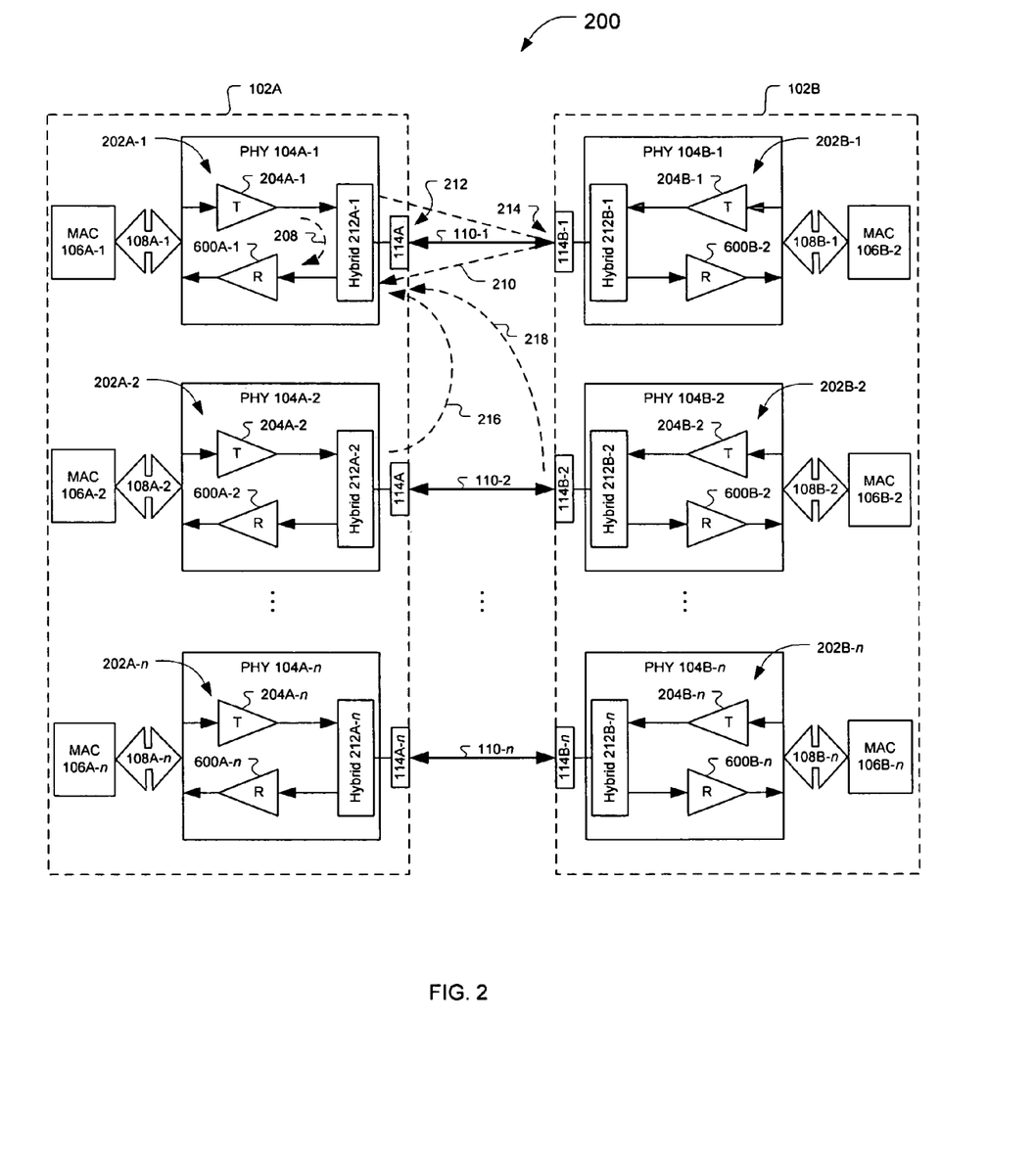
FIG. 2 is a block diagram of one embodiment of the system 100 shown in FIG. 1.

FIG. 2 is a block diagram 200 of one embodiment of system 100 shown in FIG. 1. Diagram 200 of system 100 illustrates channel impairments such as near-end and far-end echo and near-end crosstalk (NEXT) and far-end crosstalk (FEXT), among other forms or types of communication channel impairments. Communication in system 100 occurs when signals are transmitted and received between network interfaces 102A, B over communication channel 110 physical medium. Communication channel 110 physical medium may be adapted for full duplex communication although it is not limited in this context. In one embodiment, communication channel 110-1-$n$ physical media may comprise multiple cables, for example, wherein each cable may comprise, for example, copper twisted wire pairs. In one embodiment n=4 and communication channel 110 physical medium may comprise four twisted wire pairs 110-1-4, for example. In one embodiment, for each parallel communication channel 110-1-$n$ physical medium network interfaces 102A, 102B may comprise, for example, corresponding PHY units 104A-1-$n$, 104B-1-$n$ coupled to respective MAC units 106A-1-$n$, 106B-1-$n$, over respective bidirectional links 108A-1-$n$, 108B-1-$n$, for example. PHY units 104A-1-$n$, 104B-1-$n$ may comprise transceivers 202A-1-$n$, 202B-1-$n$. Transceivers 202A-1-$n$, 202B-1-$n$ each may comprise respective transmitters (T) 204A-1-$n$, 204B-1-$n$ and receivers (R) 600A-1-$n$, 600B-1-$n$, which may be coupled to respective communication channels 110-1-$n$ physical media via respective hybrid units 212A-1-$n$, 212B-1-$n$. Concurrent full duplex transmission on all communication channels 110-1-$n$ physical media, however, may lead to channel impairments such as, for example, signal attenuation, echo, crosstalk, among other impairments due to the characteristics of the physical medium.

Although communication across communication channel 110-1-$n$ physical media may be concurrent full duplex, in the following illustrative examples of channel impairments, assume that transmitter 204A-1 is transmitting information through communication channel 110-1 physical medium to receiver 600B-1 and transmitter 204A-2 is transmitting information through communication channel 110-2 physical medium to receiver 600B-2. Accordingly, in the example illustrated in FIG. 2, echo is a reflection of a transmitted signal back to transmitter 204A-1 due to impedance mismatch in various points of communication channel 110-1 physical medium, hybrid units 212A-1, 212B-1, and MDI units 114A-1, 114B-1. Echo may manifest itself as a near-end echo interference signal 208 and a far end echo interference signal 210, for example. In the illustrated embodiment, near-end 212 refers to transmitter 204A-1 side and far-end 214 refers to receivers 600B-1, 600B-2 side. The terms near-end 212 and far-end 214 are used herein merely to describe a signal from the reference point of a corresponding transmitter and the path of the transmitted signal. Each path of near- and far-end echo interference signals 208, 210 may be considered an echo-channel. Crosstalk is an unwanted signal caused by the interference between adjacent wire pairs in communication channel 110-1-$n$ physical media. In one embodiment, for example, four wire pairs may be used as communication channel 110-1-4 physical media and any adjacent wire pairs in communication channel 100-1-4 physical media may be affected by crosstalk, for example. Crosstalk may be characterized as NEXT interference signal 216 or FEXT interference signal 218. NEXT interference signal 216 is crosstalk that appears at the input of a wire pair at near-end 212, e.g., at receiver 600A-1 input, from transmitter 204A-2 at near-end 212 of communication channel 110-2 physical medium. FEXT interference signal 218 is crosstalk that appears at the input of a wire pair at near-end 212, at receiver 600A-1 input, from far-end 214 of communication channel 100-2 physical medium. Near-end and far-end crosstalk and echo interference signals may be removed by employing techniques described and illustrated herein. For example, near-end and far-end crosstalk and echo interference signals may be removed or substantially eliminated by employing an adaptive interference canceller to adaptively filter the noise reference input to maximally match and subtract out noise or interference from a primary input signal (e.g., desired signal plus noise).

In various embodiments, a signal may be passed between network interfaces 102A, B in system 100 through communication channel 110 physical medium. Communication channel 110 physical medium, however, may introduce interference signals such as, for example, ISI and an additional interference signal. The additional interference signal may comprise near-end echo interference signal 208, far-end echo interference signal 210, NEXT interference signal 216, FEXT interference signal 218, among other unwanted interference signals that may impair communications in communication channel 110 physical medium. Near-end echo interference signal 208 may be defined as an interference signal transmitted by a near-end 212 device such as transmitter 204A-1, which has passed through an echo channel, for example. Although not shown in the illustrated embodiments, receivers 600A, B may comprise analog-to-digital (A/D) converters. Accordingly, any clock jitter of the sampling clock at the A/D converter introduced by communication channel 110 physical medium, or otherwise, may result in a time-variant interference channel. An adaptive interference canceller module may be employed to eliminate or substantially suppress the time-variant interference channel, for example. The various embodiments illustrated and described herein, provide an adaptive interference canceller module as part of receivers 600A, B, for example, to adaptively filter the noise reference input to maximally match and subtract out noise or interference from a primary input signal (e.g., desired signal plus noise). Adaptation may be implemented using any of the well-known methods (e.g., LMS, RLS, Fast RLS). Therefore, implementation details of such LMS, RLS, and/or fast RLS adaptation processes or algorithms are not described herein.

To meet increasingly stringent communication system performance requirements, it may be necessary to perform equalization in order to reduce the ISI. In addition, an interference canceller module may be employed to cancel or substantially suppress the interference described above (e.g., an echo canceller, among others).

The following embodiments are described with reference to near-end 212 network interface 102A and receiver 600A-1, although the principles may be applied to any of the receivers 600A-1-n, 600B-1n in system 100. Accordingly, when receiver 600A-1 is first "switched on," it may be in an initial condition where the equalizers employed to reduce ISI have not yet converged. At this pre-convergence stage, it may be necessary to observe the input to the equalizers in order to cancel near- or far-end echo interference signals 208, 210 in addition to NEXT or FEXT interference signals 216, 218, among other potential interference signals using an interference canceller module, e.g., a first echo canceller. After the equalizer has converged, the performance of receiver 600A-1 may be enhanced by turning on an additional interference canceller, e.g., a second echo canceller, that operates at a significantly higher SNR placed at the output of the equalizer (e.g., at the output of a slicer). Such a system may converge, in a combination before and after equalizer interference canceller configuration, with enhanced performance using a single interference cancellation mechanism and an adaptation selection logical switch module. The adaptation logical switch module switches between multiple adaptation processes, techniques, or mechanisms. The adaptation logical switch module provides a smooth transition and seamless reuse of receiver 600A-1 hardware. Such smooth transition and seamless reuse of receiver 600A-1 hardware may result in power saving. Throughout this description, an interference canceller module may refer to any interference canceller modules such as, for example, near-end echo or far-end canceller module, a NEXT interference, and/or FEXT canceller module, a FEXT interference canceller module, among others, to cancel near-end and far-end echo interference signals 208, 210, NEXT interference signals 216, and/or FEXT interference signals 218. Nevertheless, the embodiments of interference canceller module described and illustrated herein are not limited to an echo or crosstalk interference canceller and may be employed in a variety of interference signal canceling techniques and/or implementation to cancel additional interference signals that may arise in system 100, for example.

In interference signal cancellation implementation techniques, there generally is a trade-off between the ability of a system to converge and to suppress interference signals. These tradeoffs are evident, for example, in conventional ISI cancellation schemes where an echo canceller is located either before or after the equalizer. Various embodiments described herein provide techniques to eliminate or substantially reduce or minimize this trade-off, by achieving both attributes. For example, the various embodiments provide techniques to exploit the benefits of placing the interference canceller module either before or after the equalizer without the detriments of either implementation scheme alone. For example, the various embodiments provide the benefit of both—fast and robust convergence of the various components of the receiver system 600A-1 (including timing recovery algorithms, equalizers, and interference cancellers) on one hand, and high interference signal suppression on the other, while enabling better system performance from all aspects.

Figure 3:
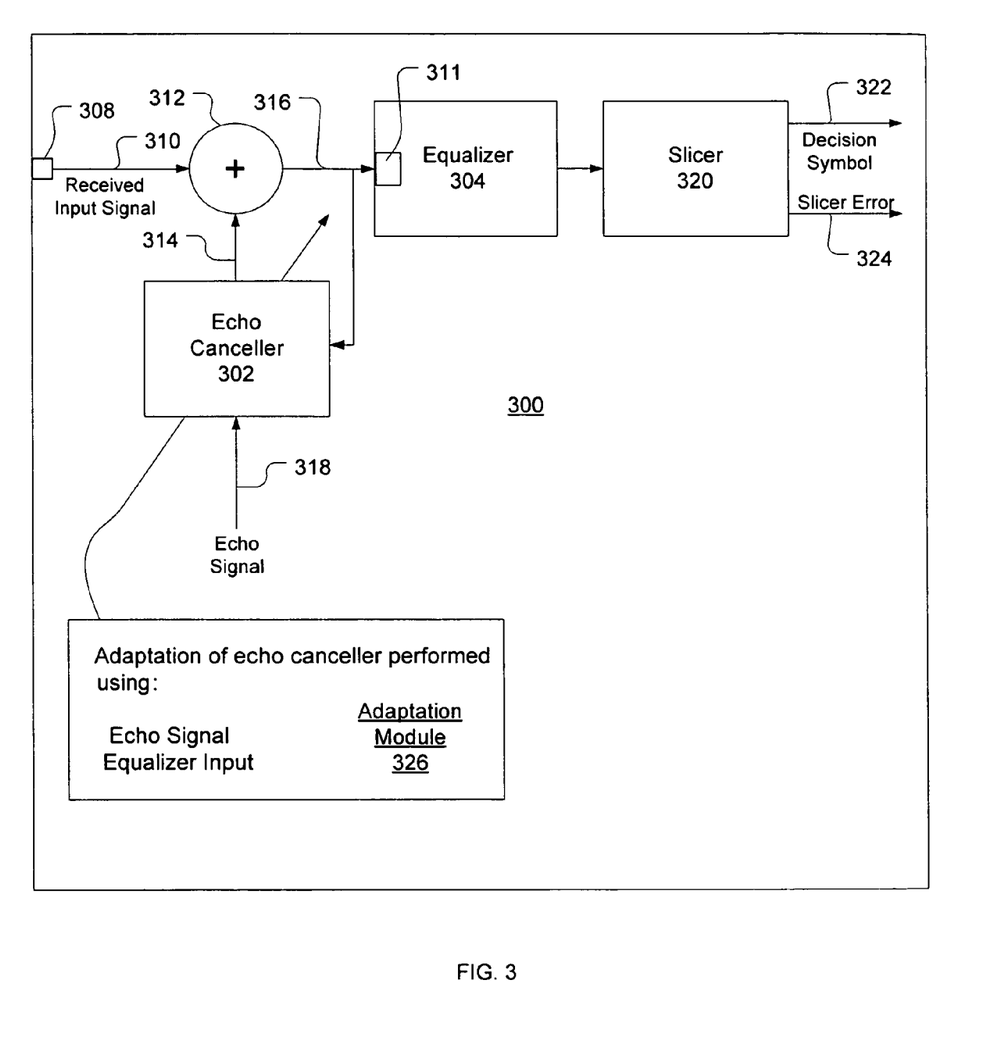
FIG. 3 is a diagram of a conventional receiver.

FIG. 3 is a diagram of a conventional receiver 300. Receiver 300 comprises a digital echo canceller 302 and an equalizer 304. In the implementation illustrated in FIG. 3, echo canceller 302 is located before equalizer 304. The term "before" is used to indicate that an interference signal 318, such as an echo interference signal or crosstalk interference signal, passing through an interference channel (e.g., echo channel) at input 311 of equalizer 304 is processed by echo canceller 302 in time before it is processed by equalizer 304. Receiver 300 comprises a line interface 308 by which receiver 300 is coupled to communication channel 110 physical medium and receives receiver input signal 310.

Receiver 300 also comprises a summer 312. Summer 312 comprises a first input coupled to line interface 308 and a second input coupled to echo canceller 302 to receive respective receiver input signal 310 from line interface 308 and adaptive signal 314 provided by echo canceller 302 as input signals. Summer 312 is coupled to equalizer 304. Summer 312 operates to sum its input signals, receiver input signal 310 and adaptive signal 314, to produce an output signal 316 (e.g., equalizer input signal 316) as input to equalizer 304.

Echo canceller 302 is coupled to a second input of summer 312. Output of summer 312 also is coupled to echo canceller 302. Output of summer 312 provides equalizer input signal 316 to echo canceller 302 as feedback. Echo canceller 302 also receives echo interference signal 318. Adaptation of echo canceller 302 is performed using echo interference signal 318 and equalizer input signal 316. Echo canceller 302 cancels echo interference signal 318.

Equalizer 304 is coupled to the output of summer 312. Equalizer 304 may be implemented as a high-pass filter (HPF). Equalizer 304 may be a finite impulse response (FIR) filter implemented as an adaptive feed forward equalizer (FFE) to receive the equalizer input signal 316. Equalizer 304 may operate in accordance with conventional principles and in combination with other components may operate to equalize equalizer input signal 316 to reduce or substantially eliminate ISI. Adaptive FFE, for example, may adapt equalizer 304 characteristics it applies to equalizer input signals 316 on the basis of echo interference signal 318.

Receiver 300 also comprises a slicer 320. Slicer 320 is coupled to the output of equalizer 304. Slicer 320 may operate in accordance with conventional principles to produce a decision symbol 322 and a slicer error signal 324, as output signals. Decision symbol 322 may reflect a filtered and/or equalized version of equalizer input signal 316 and may contain the data to be recovered from receiver input signal 310. Slicer error signal 324 may be an error signal that indicates a deviation of equalizer input signal 316 from a pre-determined ideal signal profile of received input signal 310. Decision symbol 322 and slicer error signal 324 may be provided to MAC unit 106 for further processing.

Although not shown, receiver 300 also may comprise receiver analog front end electronics coupled to line interface 308 to receive receiver input signal 310 via communication channel 110 physical medium. The receiver analog front end electronics may perform signal conditioning on receiver input signal 310 in accordance with conventional practices. Receiver 300 may further comprise an A/D converter coupled to the receiver analog front end electronics to receive the incoming signals. The A/D converter converts incoming signals into a stream of digital samples. Receiver 300 also may comprise an automatic gain control (AGC) circuit (or block) which is coupled to the A/D converter to receive the stream of digital samples output by the A/D converter. The AGC circuit may operate in accordance with conventional principles and, as a part of its conventional operation, may determine a physical characteristic of communication channel 110 physical medium such as cable length, for example. Further, equalizer 304 may be considered to be coupled to line interface 308 via receiver 300 analog front end electronics and the A/D converter, for example.

Echo canceller 302 is located before equalizer 304. This configuration provides advantages in that the overall echo channel required to be cancelled at the input of equalizer 304 does not include equalizer 304. As previously discussed equalizer 304 may be implemented as a HPF to equalize a communication channel 110 physical medium, which is a low-pass filter (LPF) in nature. This is described below with respect to FIG. 4. Accordingly, locating echo canceller before equalizer 304 creates an echo channel that is substantially insensitive to clock jitter and to high slopes in the echo channel.

In receiver 300, adaptation module 326 with echo canceller 302 located before equalizer 304 uses interference signal 318 and equalizer input signal 316 to perform the adaptation of echo canceller 302. Equalizer input signal 316 as an input to adaptation module 326, which is also the input signal to equalizer 304. Equalizer input signal 316 is at a very low SNR because it includes a far-end echo signal (e.g., far-end echo signal 210), its ISI, and additional interferences (e.g., NEXT, FEXT, among other interference signals), in addition to echo interference signal 318 it is required to cancel. Accordingly, the echo suppression and/or cancellation capabilities of receiver 300 utilizing adaptation module 326 are usually limited.

Figure 4:
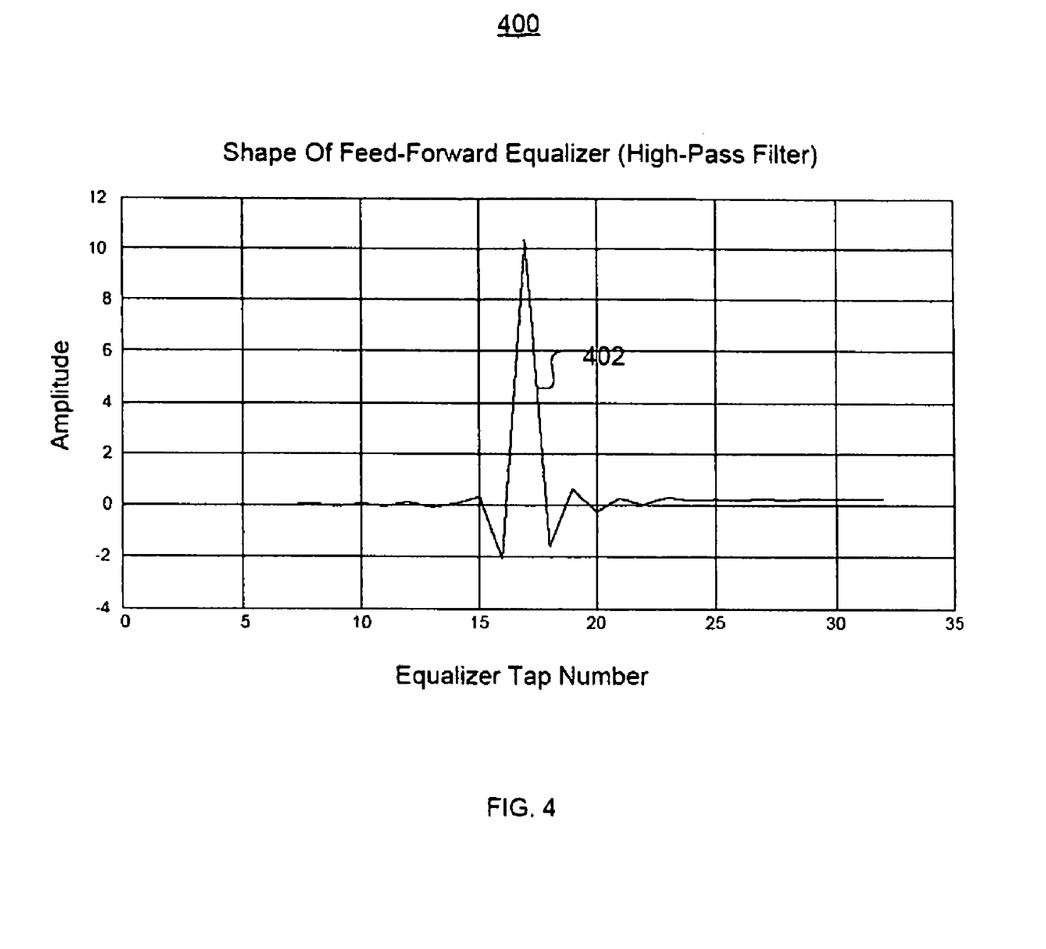
FIG. 4 is a graphical representation of one example of a desired equalizer response shape.

FIG. 4 is a graphical representation of one example of a desired equalizer 304 response 400 shape. Equalizer 304 tap number is indicated along the horizontal axis and amplitude is indicated along the vertical axis. Response 400 is a typical HPF response curve 402 of a FFE implemented equalizer 304.

Figure 5:
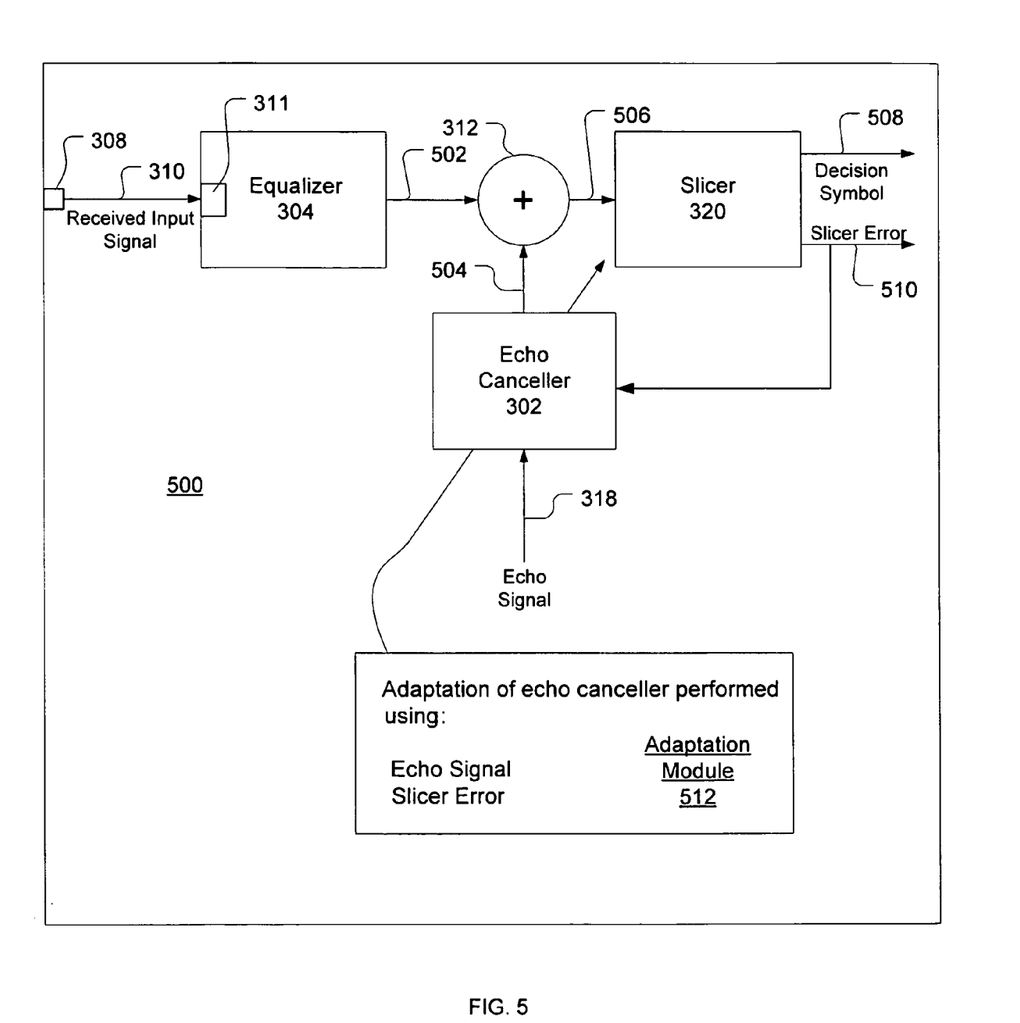
FIG. 5 is a diagram of a conventional receiver.

FIG. 5 is a diagram of a conventional receiver 500. Receiver 500 comprises digital echo canceller 302 and equalizer 304. In the implementation illustrated in FIG. 5, echo canceller 302 is located after equalizer 304. The term "after" is used to indicate that interference signal such as echo interference signal 318 passing through an echo channel is processed by echo canceller 302 in time after it is processed by equalizer 304.

As shown in FIG. 5, equalizer 304 is coupled to line interface 308 and to summer 312. Equalizer 304 receives receiver input signal 310 from line interface 308 as a first input. Equalizer 304, in accordance with conventional principles, equalizes receiver input signal 310 to reduce or substantially eliminate ISI and produces an output signal 502 (e.g., slicer input signal 502). Equalizer 304 is coupled to the first input of summer 312 and provides adaptive echo interference signal 504 to the first input of summer 312.

Echo canceller 302 is coupled to the second input of summer 312 and provides adaptive echo interference signal 504 to the second input of summer 312. Summer 312 operates to sum its input signals, output signal 502 from equalizer 304 and adaptive echo interference signal 504, to produce slicer input signal 506 to slicer 320. Slicer 320 may operate in accordance with conventional principles to produce a decision symbol 508 and a slicer error signal 510, as output signals. Slicer error signal 510 is provided as feedback to echo canceller 302 such that the adaptation of echo canceller 302 may be performed using echo interference signal 318 and slicer error signal 510. Echo canceller 302 cancels echo interference signal 318 interference.

In receiver 500, adaptation of echo canceller 302 located after equalizer 304 utilizes adaptation module 512, which provides certain advantages and disadvantages. Conventional methods of adaptation of echo canceller 302 located after equalizer 304, as in receiver 500, for example, uses slicer error signal 510 after it has been processed by equalizer 304 and slicer 320. Processing slicer input signal 506 through slicer 320 removes the far-end signal interference after the ISI is removed, and results in a slicer error signal 510, which is composed mainly of the interference signals. To echo canceller 302 slicer error signal 510 looks like a signal with a high SNR for because it does not include the far-end signal interference, which is removed by slicer 320, and is comprised mainly of echo interference signal 318. Echo interference signal 318 may be considered to be a time-invariant signal.

Accordingly, the echo suppression and/or cancellation capabilities of echo canceller 302 utilizing adaptation module 512 are usually superior to configurations where, as in receiver 500, echo canceller 302 is located before equalizer 304, as illustrated and described with respect to receiver 300 in FIG. 3. Nevertheless, there are implementation limitations associated with the time-invariant echo channel.

For example, in the implementation of echo suppression employed in receiver 500, the overall echo channel required to be cancelled also includes equalizer 304. Equalizer 304 is usually a HPF because it equalizes a physical channel, e.g., communication channel 110 physical medium, which is a low-pass filter in nature. Therefore, echo channel adaptation with echo canceller 302 located after equalizer 304 may be very sensitive to jitter and to high slopes in the echo channel.

Accordingly, in receiver 500, the echo suppression and/or cancellation capabilities echo canceller 302 located after equalizer 304 and processed in accordance with adaptation module 512 may be limited by the ability to track the changes in the echo channel, which may be amplified by the HPF in equalizer 304.

Figure 6:
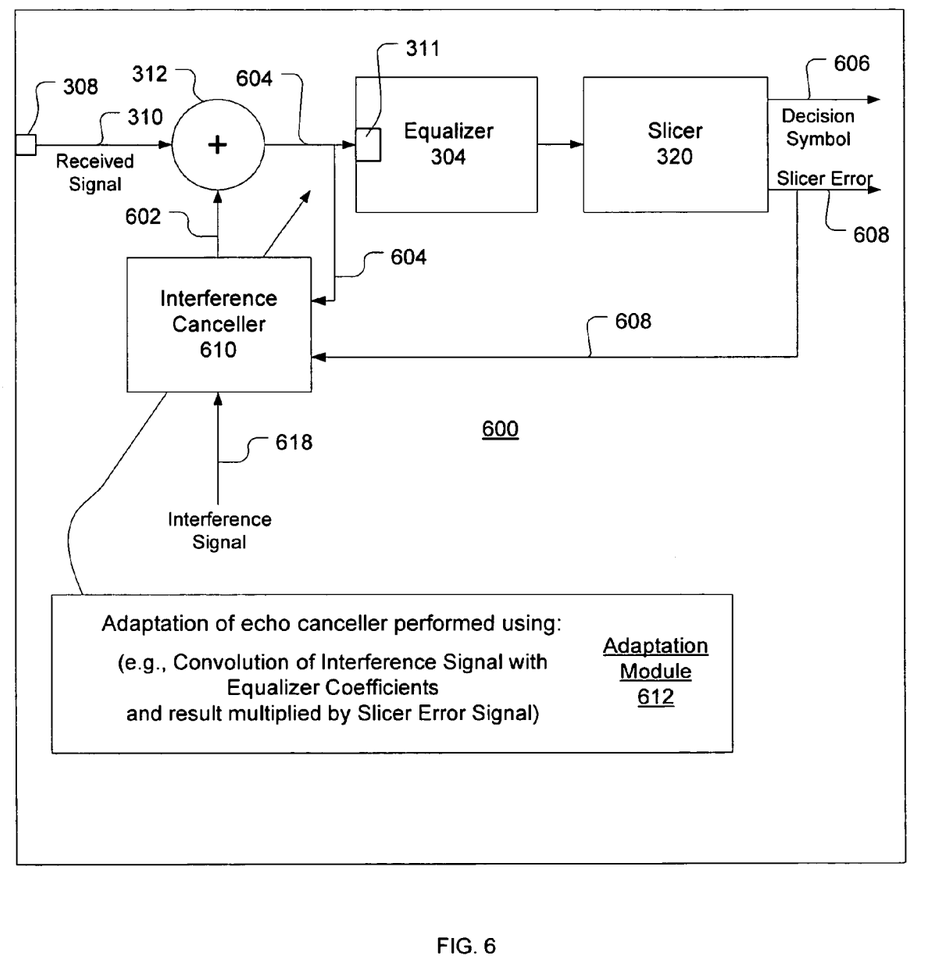
FIG. 6 is a diagram of one embodiment of a receiver.

FIG. 6 is a diagram of one embodiment of receiver 600. Receiver 600 may be used in system 100. For example, receiver 600 may be representative of receivers 600A-1-$n$, 600B-1-$n$, that may be used in respective PHY units 104A-1-$n$, 104B-1-$n$ comprising transceivers 202A-1-$n$, 202B-1-$n$. Transceivers 202A-1-$n$, 202B-1-$n$ each may comprise respective transmitters (T) 204A-1-$n$, 204B-1-$n$ and receivers (R) 600A-1-$n$, 600B-1-$n$, which may be coupled to respective communication channels 110-1-$n$ via respective hybrid units 212A-1-$n$, 212B-1-$n$. In one embodiment, receivers (R) 600A-1-$n$, 600B-1-$n$ may be implemented in accordance with the techniques described with reference to FIG. 6 and receiver 600. Receiver 600 comprises interference canceller 610 and equalizer 304. In one embodiment, interference canceller 610 may be a digital interference canceller, for example. In the illustrated embodiment, interference canceller 610 is located before equalizer 304. Receiver 600 comprises line interface 308 by which receiver 600 is coupled to communication channel 110 physical medium. Receiver 600 receives receiver input signal 310 from communication channel 110 physical medium via line interface 308.

Receiver 600 comprises summer 312. Summer 312 comprises a first input coupled to line interface 308 and a second input coupled to interference canceller 610 to receive respective receiver input signal 310 from line interface 308 and adaptive signal 602 from interference canceller 610 as input signals. Summer 312 is coupled to equalizer 304 via input 311. Summer 312 operates to sum its input signals, receiver input signal 310 and adaptive signal 602, to produce output signal 604 (e.g., equalizer input signal 604) as input to equalizer 304.

Interference canceller 610 is coupled to a second input of summer 312. Output of summer 312 also is coupled to interference canceller 610 to provide equalizer input signal 604 to interference canceller 610 as feedback. Interference canceller 610 also receives interference signal 618. In one embodiment, interference signal 618 may be a near-end or far-echo interference signal, a NEXT or FEXT interference signal, among other types of interference signals.

Equalizer 304 is coupled to the output of summer 312. Equalizer 304 may be implemented as a HPF. Equalizer 304 may be a FIR equalizer implemented as an adaptive FFE to receive equalizer input signal 604. Equalizer 304 contains multiple equalizer coefficients. It will be appreciated, however, that the embodiments may be expanded to other forms or types of equalizers. Equalizer 304 may operate in accordance with conventional principles and in combination with other components to equalize equalizer input signal 604 utilizing equalizer coefficients to reduce or substantially eliminate ISI. Adaptive FFE, for example, may adapt equalizer 304 characteristics to equalizer input signals 604 on the basis of interference signal 618.

Receiver 300 also comprises slicer 320. Slicer 320 is coupled to the output of equalizer 304. Slicer 320 may operate in accordance with conventional principles to produce a decision symbol 606 and a slicer error signal 608, as output signals. Decision symbol 606 may reflect a filtered and/or equalized version of equalizer input signal 604 and may contain the data to be recovered from receiver input signal 310. Slicer error signal 608 may be an error signal that indicates a deviation of equalizer input signal 604 from a pre-determined ideal signal profile of receiver input signal 310. Decision symbol 606 and slicer error signal 608 may be provided to MAC unit 106, for example. Slicer error signal 608 also may be provided to interference canceller 610. Adaptation of interference canceller 610 is performed using adaptation module 612 using interference signal 618, the equalizer coefficients, and slicer error signal 608. In one embodiment, adaptation module 612 utilizes the convolution of interference signal 618 with the equalizer coefficients and multiplies the result by slicer error signal 608 to perform the adaptation of interference canceller 610. In addition, based on the convergence status of equalizer 304, adaptation of interference canceller 610 may be performed using interference signal 618 multiplied by equalizer input signal 604. Interference canceller 610 cancels interference signal 618. In one embodiment, adaptation module 612 provides a sufficiently high SNR at slicer 320 when equalizer 304 (e.g., FFE) has substantially converged.

In the adaptation techniques and echo canceller 302/equalizer 304 configurations described with reference to receivers 300, 500, placing echo interference canceller 302 before or after equalizer 304 results in a performance margin budget that is utilized by echo interference canceller 302 performance. Because conventional receivers 300, 500 traditionally have a relatively large performance margin taking up part of this budget was customary and did not impact performance significantly.

In 10GBASE-T systems (e.g., system 100), however, performance requirements are much higher. Therefore, system 100 margin is much smaller. Accordingly, it may be necessary for each component in system 100 to have far superior capabilities than in conventional solutions. In this manner, as little as possible of system 100 performance budget can be utilized in order to meet the more stringent requirements. For example, in one embodiment, the echo cancellation requirements may be approximately 60 dB of echo suppression, compared to approximately 40 dB in conventional systems.

Accordingly, receiver 600 may be implemented to converge using a first adaptation process initially when slicer 320 has a low SNR output and then switch to a second adaptation process when the SNR at slicer 320 output is sufficiently high such that equalizer 304 converges to a high-performing system. In one embodiment, this may be achieved with maximal reuse of hardware (interference cancellers 610) and seamless continuity. The adaptation technique illustrated with reference to receiver 600 is based on a "smart" adaptation process employing a logical adaptation selection module described below. Although, the embodiments are described as switching or selecting between two adaptation processes, the principles can be extended to a multiple adaptation processes. The embodiments are not limited in this context.

The advantage of having enhanced performance interference cancellation (e.g., near or far end echo, NEXT, FEXT, and other impairment cancellation) in receiver 600 is a much improved echo suppression capability. In addition, interference signal 618 cancellation in receiver 600 provides enhanced overall performance of system 100 and a much higher operating SNR margin without incurring the penalty of additional hardware. The additional performance margin results in lower power consumption for receiver 600, and therefore, for communication system 100. As is well known, power is a factor in communication system 100 including, for example, 10GBASE-T communication systems.

Figure 7:
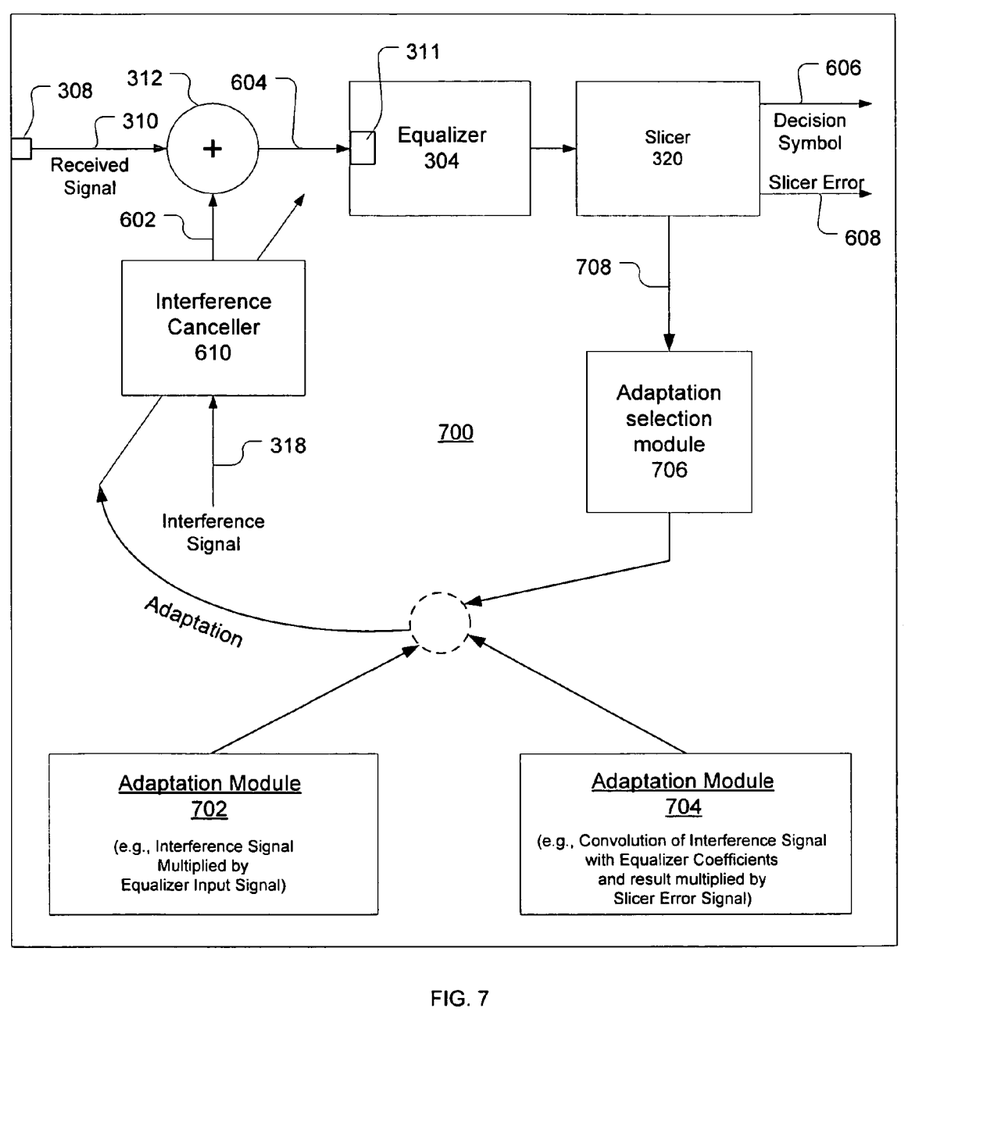
FIG. 7 is a diagram that illustrates one embodiment of the adaptation process of interference canceller and one embodiment of the convergence method of equalizer in receiver.

FIG. 7 is a diagram 700 that illustrates one embodiment of the adaptation process of interference canceller 610 and one embodiment of the convergence method of equalizer 304 in receiver 600. FIG. 7 is a block diagram 700 of receiver 600 including a first logical block representing adaptation module 702 and a second logical block representing adaptation module 704. As previously discussed, this principle may be extended to multiple adaptation processes, for example. Diagram 700 logically illustrates the implementation of the selection of respective adaptation modules 702, 704 of interference canceller 610 based on information from slicer 320. For example, in one embodiment, adaptation selection module 706 may be employed to monitor information 708 associated with slicer 320. In one embodiment, the criteria for switching between adaptation modules 702, 704 may be defined in terms of a threshold, for example. In one embodiment, a criterion for switching between adaptation modules 702, 704 may be a threshold associated with slicer 320. For example, in one embodiment, the threshold may be a slicer 320 output SNR indicating a convergence status of equalizer 304. For example, a threshold for switching may be when slicer 320 SNR indicates that equalizer 304 has sufficiently converged. Accordingly, in one embodiment, information from slicer 320, such as for example, slicer 320 SNR, may be used to select one of two adaptation modules 702, 704. In one embodiment, adaptation of interference canceller 610 may initially begin with adaptation module 702 when slicer 320 SNR is low and then, adaptation selection module 706 may switch to adaptation module 704 when slicer 320 SNR reaches or crosses a predetermined SNR threshold. In one embodiment, adaptation module 702 performs adaptation of interference canceller 610 using, for example, interference signal 618 multiplied by equalizer input signal 604. Adaptation module 704 performs adaptation of interference canceller 610 using, for example, the convolution of interference signal 618 and the equalizer coefficients, and multiplying the results by slicer error signal 608. In one embodiment, adaptation module 704 performs the adaptation at a higher SNR relative to adaptation module 702, after equalizer 304 convergence. Further, the adaptation transition from adaptation module 702 to adaptation module 704 is seamless in the sense that the interference canceller 610 coefficients remain the same in both adaptations, but are adapted via adaptation module 704 at a higher SNR relative to adaptation module 702.

Although not shown, receiver 700 also may comprise receiver analog front end electronics coupled to line interface 308 to receive receiver input signal 310 via communication channel 110 physical medium. Receiver 700 analog front end electronics may perform signal conditioning on receiver input signal 310 in accordance with conventional practices. Receiver 700 may further comprise an A/D converter coupled to the receiver analog front end electronics to receive the incoming signals. The A/D converter converts incoming signals into a stream of digital samples. Receiver 700 also may comprise an AGC circuit (or block) which is coupled to the A/D converter to receive the stream of digital samples output by the A/D converter. The AGC circuit may operate in accordance with conventional principles and, as a part of its conventional operation. Further, equalizer 304 may be considered to be coupled to line interface 308 via receiver 700 analog front end electronics and the A/D converter, for example.

One embodiment of a method for enhanced performance of pre-equalizer adaptive cancellers using smart adaptation may be employed in system 100 and receivers 600, 700. The adaptation of interference canceller 610 may be performed in accordance with the following mathematical description the adaptation processes. One embodiment of the adaptation process may be described for a FIR equalizer 304, implemented as a FFE equalizer 304. The embodiments, however, can be extended to equalizers in other forms. In addition, the adaptation method according to various embodiments may be implemented with an LMS, RLS, fast RLS, or other similar adaptation algorithms. Various embodiments of the overall interference cancellation techniques may be employed in a similar manner for any equalizer form and adaptation algorithm.

The following variables define the characteristics of the various components described in receivers in the various embodiments. Accordingly:

$h_{FFE}$ denotes the impulse response of FFE equalizer 304.

$h_{EC}$ denotes the impulse response of interference canceller 610.

The term "echo" denotes interference signal 618 fed into interference canceller 610.

The term "error" denotes slicer error signal 608 of slicer 320.

The convolution operation may be denoted by *.

The multiplication operation be denoted by ·

The result of passing the echo (e.g., interference signal 618) through interference canceller 610 and FFE equalizer 304 is:

$$\text{echo} * h_{EC} * h_{FFE} \quad (1)$$

Equation (1) may be interpreted in the following manner and may be used to describe adaptation module 702:

$$(\text{echo} * h_{EC} * h_{FFE}) = (\text{echo} * h_{EC}) * h_{FFE} \quad (2)$$

In operation, interference canceller 610 attempts to cancel the echo channel present at the input 311 of equalizer 304 (similar to $h_{EC}$). The result is filtered through FFE equalizer 304. To adapt the impulse response of interference canceller 610, $h_{EC}$, the conventional approach using, for example, the LMS algorithm is to adapt $h_{EC}$ using the echo (e.g., interference signal 618) and echo channel at the input 311 of equalizer 304. Equation (2) may be employed when interference canceller 610 is located before FFE equalizer 304.

Equation (1), and therefore, adaptation module 702 may be interpreted in the alternative manner as follows:

$$(\text{echo} * h_{EC} * h_{FFE}) = \text{echo} * (h_{ECbefore} * h_{FFE}) \quad (3)$$

Accordingly, interference canceller 610 is attempting to cancel the echo channel present at the output of equalizer 304. Equation (3) is similar to:

$$h_{ECafter} = h_{ECbefore} * h_{FFE} \quad (4)$$

To adapt $h_{ECafter}$ using adaptation module 702 using the LMS algorithm, $h_{ECafter}$ may be adapted using echo 618 and slicer error 608. This is for the technique of placing interference canceller 610 after FFE equalizer 304.

In one embodiment, with $h_{EC}$ (e.g., interference canceller 610) placed before equalizer 304:

$$(\text{echo} * h_{EC} * h_{FFE}) = (\text{echo} * h_{FFE}) * h_{EC} \quad (5)$$

Interference canceller 610 is attempting to cancel the echo channel 604 present at input 311 of equalizer 304 (e.g., similar to $h_{EC}$), then the result is filtered through the FFE equalizer 304. In order to adapt the impulse response of interference canceller 610, $h_{EC}$, embodiments of adaptation module 704 for enhanced performance of pre-equalizer adaptive cancellers using adaptation selection module 706 utilizes the convolution of interference signal 618 and equalizer input signal 604 represented by echo*$h_{EC}$, and slicer error 608 to adapt the LMS algorithm.

It should be noted that the various embodiments of the adaptation and filtration processes described above can be performed either in time or frequency domain, or in common time-frequency domain. The adaptation mechanism that can be used here is not restricted to being only LMS, but may be based on other learning algorithms like RLS, among others.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
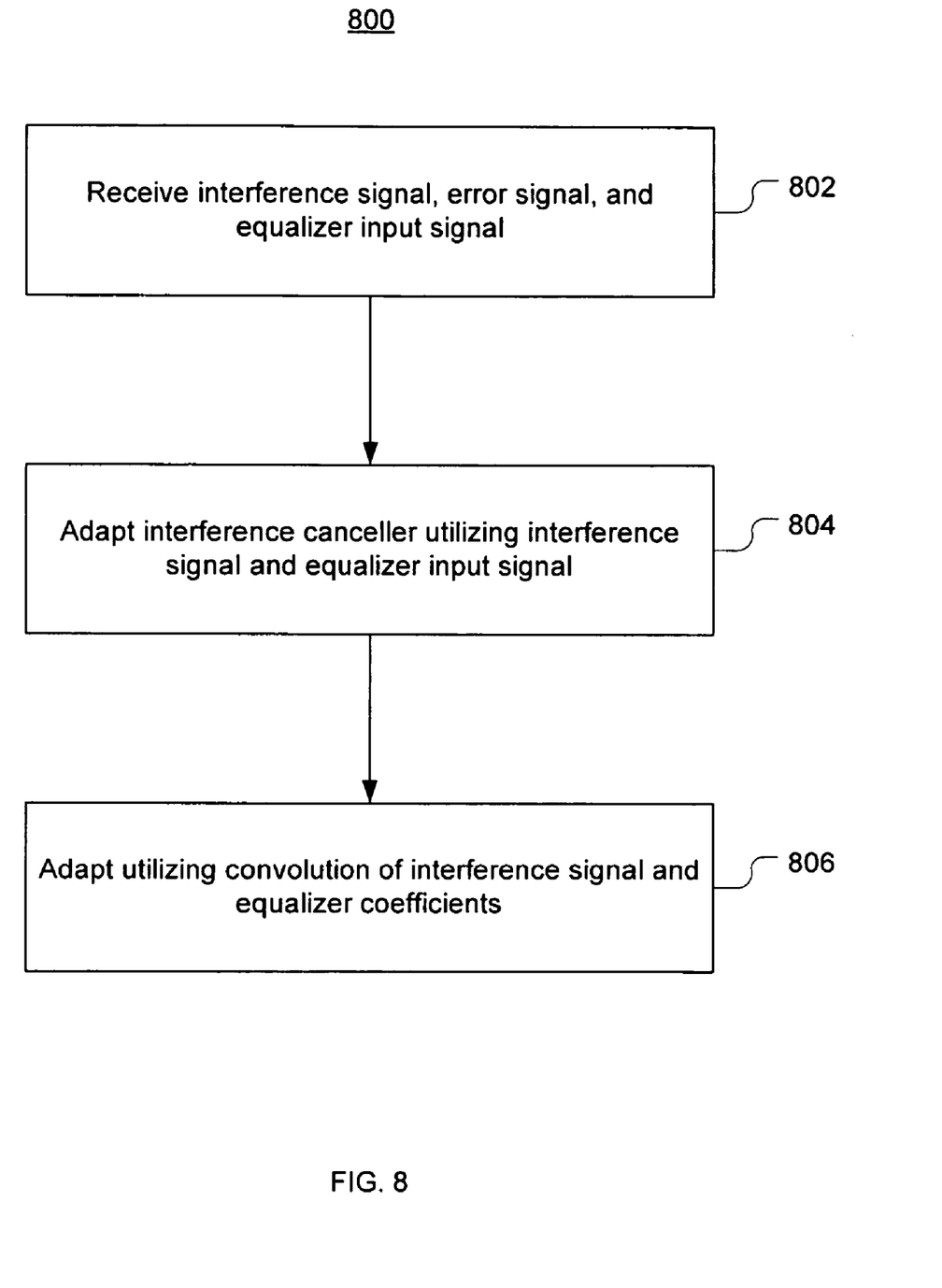
FIG. 8 illustrates one embodiment of a logic flow.

FIG. 8 illustrates one embodiment of a logic flow. FIG. 8 illustrates a logic flow 800. Logic flow 800 may be representative of the operations executed by one or more embodiments described herein. As shown in logic flow 800, interference canceller 610 receives (802) interference signal 618, error signal 608, and equalizer input signal 604. Adaptation module 702 adapts (804) interference canceller 610 utilizing interference signal 618 and equalizer input signal 604. For example, by multiplying interference signal 618 and equalizer input signal 604. Adaptation module 704 adapts (806) interference canceller 610 utilizing the convolution of interference signal 618 with the equalizer coefficients, and multiplying the result by the slicer error. In addition, the adaptation transition from adaptation module 702 to adaptation module 704 is seamless in the sense that the interference canceller 610 coefficients remain the same in both adaptations, but are adapted via adaptation module 704 at a higher SNR relative to adaptation module 702.

Adaptation selection module 706 receives information associated with a convergence of equalizer 304 and selects either a first adaptation module 702 or a second adaptation module 704 to adapt interference canceller 610. Adapting interference canceller 610 utilizes interference signal 618 and equalizer input signal 604. Adaptation selection module 706 receives a signal-to-noise ratio (SNR) signal from slicer 320. The SNR indicates a convergence status of equalizer 304. Summer 312 sums input signal 310 and interference canceller output 602 and produces equalizer input signal 604.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

In various embodiments, system 100 may be implemented as a wireless system, a wired system, or a combination of both. When implemented as a wireless system, system 100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Apparatus 600, 700 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In various implementations, system 100 or apparatus 600, 700 may be illustrated and described as comprising several separate functional elements, such as modules and/or blocks.

Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, FPGAs, ASICs, circuits, registers), software components (e.g., programs, subroutines, logic) and/or combination thereof.

In various embodiments, system 100 or apparatus 600, 700 may comprise multiple modules connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, PCB, backplane, semiconductor material, twisted-pair wire, co-axial cable, fiber optics, and so forth. An example of a wireless communications media may include portions of a wireless spectrum, such as the radio-frequency (RF) spectrum. The embodiments are not limited in this context.

The modules may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The embodiments are not limited in this context.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
   an interference canceller to receive an interference signal and to produce an adaptive signal, said interference canceller to be adapted by a first adaptation module;
   an equalizer coupled to said interference canceller, said interference canceller is located before said equalizer, said equalizer to receive an input signal formed of a sum of a received input signal and said adaptive signal; and
   a slicer coupled to said equalizer and to said interference canceller, said slicer to receive an equalized version of equalizer coefficients and to produce a slicer error;
   wherein said first adaptation module is to adapt said interference canceller utilizing a convolution of said interference signal with said equalizer coefficients multiplying the result by said slicer error;
   an adaptation selection module coupled to said slicer;
   wherein said adaptation selection module is to receive information associated with a convergence status of said equalizer from said slicer and to select either said first adaptation module or a second adaptation module to adapt said interference canceller;
   wherein said second adaptation module is to adapt said interference canceller at a higher signal-to-noise ratio (SNR) relative to said first adaptation module after said equalizer converges; and
   wherein said adaptation transition between said first and second adaptation modules use a same set of coefficients for the interference canceller.

2. The apparatus of claim 1, wherein said second adaptation module is to adapt said interference canceller utilizing said interference signal and said equalizer input signal.

3. The apparatus of claim 1, wherein said adaptation selection module is to receive a SNR signal from said slicer, wherein said SNR indicates said convergence status of said equalizer.

4. The apparatus of claim 1, comprising:
   a summer coupled between said interference canceller and said equalizer;
   wherein said summer is to sum said received input signal and said adaptive signal to produce said equalizer input signal.

5. A system, comprising:
   an interface to couple to a communication channel physical medium; and a receiver coupled to said interface, said receiver comprising:
an interference canceller to receive an interference signal and to produce an adaptive signal, said interference canceller to be adapted by a first adaptation module;
an equalizer coupled to said interference canceller, said interference canceller is located before said equalizer, said equalizer to receive an input signal formed of a sum of a received input signal and said adaptive signal; and
a slicer coupled to said equalizer and to said interference canceller, said slicer to receive an equalized version of equalizer coefficients and to produce a slicer error;
wherein said first adaptation module is to adapt said interference canceller utilizing a convolution of said interference signal with said equalizer coefficients, and multiplying the results by said slicer error;
an adaptation selection module coupled to said slicer;
wherein said adaptation selection module is to receive information associated with a convergence status of said equalizer from said slicer and to select either said first adaptation module or a second adaptation module to adapt said interference canceller;
wherein said second adaptation module is to adapt said interference canceller at a higher signal-to-noise ratio (SNR) relative to said first adaptation module after said equalizer converges; and
wherein said adaptation transition between said first and second adaptation modules use a same set of coefficients for the interference canceller.

6. The system of claim 1, wherein said second adaptation module is to adapt said interference canceller utilizing said interference signal and said equalizer input signal.

7. The system of claim 1, wherein said adaptation selection module is to receive a SNR signal from said slicer, wherein said SNR indicates said convergence status of said equalizer.

8. The system of claim 5, comprising:
a summer coupled between said interference canceller and said equalizer;
wherein said summer is to sum said received input signal and said adaptive signal to produce said equalizer input signal.

9. A method, comprising:
receiving, at an interference canceller, an interference signal, an error signal, and an equalizer input signal;
adapting an interference canceller utilizing said interference signal and said equalizer input signal at an adaptation module;
wherein said adapting comprises multiplying said interference signal with said equalizer input signal;
receiving information associated with a convergence of an equalizer;
selecting either said first adaptation module or a second adaptation module to adapt said interference canceller, wherein said first and second adaptation modules use a same set of coefficients for the interference canceller; and
adapting said interference canceller utilizing a convolution of said interference signal with equalizer coefficients, and multiplying the results by said error signal.

10. The method of claim 9, comprising:
receiving a signal-to-noise ratio (SNR) signal from a slicer, wherein said SNR indicates said convergence status of said equalizer.

11. The method of claim 9, comprising:
summing said input signal and said adaptive signal; and
producing said equalizer input signal.

12. An article comprising a computer-readable storage medium containing computer executable instructions that if executed by a processor enable a system to receive an interference signal, an error signal, and an equalizer input signal; and adapt an interference canceller utilizing said interference signal and said equalizer input signal; wherein said adapt comprises multiplying said interference signal with said equalizer input signal, receive information associated with a convergence of an equalizer; and select either said first adaptation module or a second adaptation module to adapt said interference canceller, wherein said first and second adaptation modules use a same set of coefficients for the interference canceller, and adapt said interference canceller utilizing a convolution of said interference signal with equalizer coefficients, and multiplying the results by said error signal.

13. The article of claim 12, comprising instructions that if executed enable the system to receive a signal-to-noise ratio (SNR) signal from a slicer, wherein said SNR indicates said convergence status of said equalizer.

14. The article of claim 12, comprising instructions that if executed enable the system to sum said input signal and said adaptive signal; and produce said equalizer input signal.

* * * * *